F. PRIOR.
BEET HARVESTING MACHINE.
APPLICATION FILED NOV. 20, 1916.
1,284,449.
Patented Nov. 12, 1918.
2 SHEETS—SHEET 1.
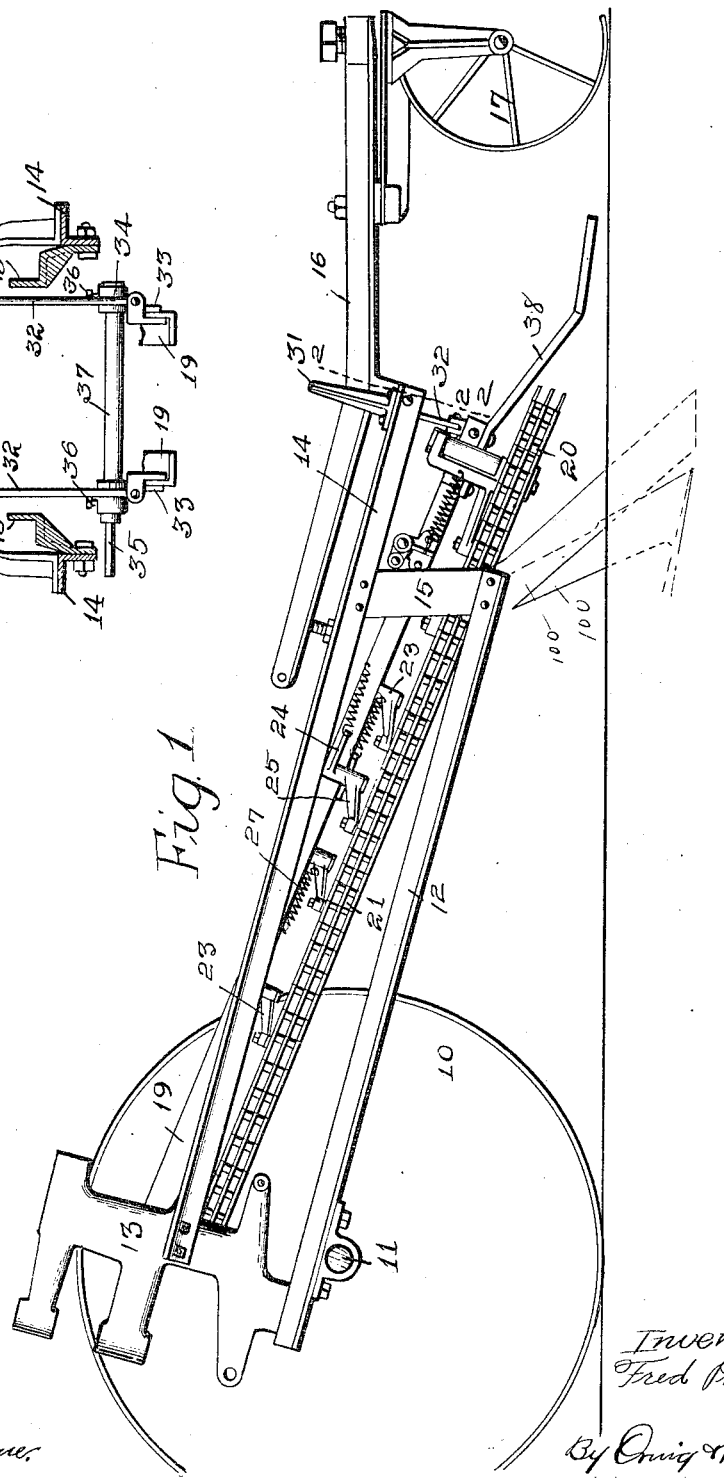

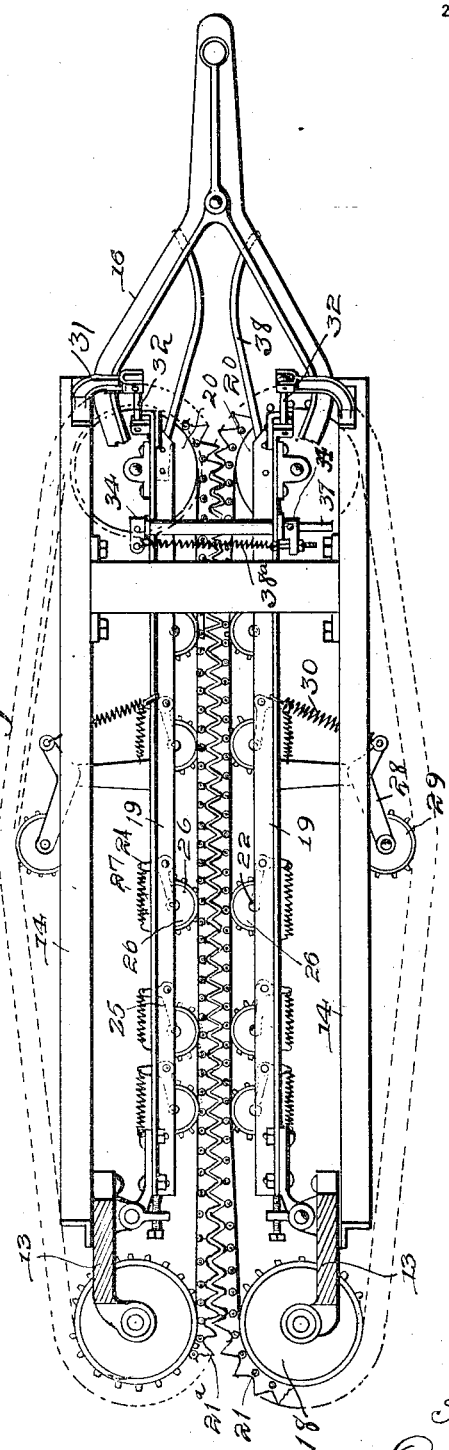

UNITED STATES PATENT OFFICE.

FRED PRIOR, OF DES MOINES, IOWA.

BEET-HARVESTING MACHINE.

1,284,449.  Specification of Letters Patent.  Patented Nov. 12, 1918.

Application filed November 20, 1916. Serial No. 132,376.

*To all whom it may concern:*

Be it known that I, FRED PRIOR, a citizen of the United States, and resident of Des Moines, in the county of Polk and State of Iowa, have invented certain new and useful Beet-Harvesting Machine, of which the following is a specification.

The object of my invention is to provide a beet harvesting mechanism of comparatively simple construction.

A further object is to provide a machine of the general class mentioned having mechanism adapted to loosen the beet in the ground and to receive the beets and to carry them to a predetermined point in the machine, such mechanism being so mounted and arranged as to be capable of adjustment with relation to the main frame of the machine for properly gripping the beets and picking them up even though the main frame of the machine may vary somewhat in its position with relation to the row of beets.

A further object is to provide in such a machine mechanism for carrying the beets capable of limited adjustment, whereby the machine is adapted for carrying beets of different sizes.

My invention consists in the construction, arrangement and combination of the various parts of the device whereby the objects contemplated are attained, as hereinafter more fully set forth, pointed out in my claims, and illustrated in the accompanying drawings, in which:

Figure 1 shows a side elevation of a beet harvesting machine embodying my invention.

Fig. 2 shows a vertical, sectional view taken on the line 2—2 of Fig. 1.

Fig. 3 shows a top or plan view of the machine, and

Fig. 4 shows a detail, sectional view of part of the mechanism.

In the accompanying drawings, in Fig. 1 I have shown a large supporting rear wheel indicated by the reference numeral 10 mounted on the axle 11 which is shown in section, one of the large wheels being removed for better illustrating the frame of the machine.

Pivotally supported on the axle 11 are spaced parallel frame members 12 extending downwardly and forwardly from said axle. Mounted on the rear ends of the frame members 12 are upwardly extending frame members 13. Secured to the frame members 13 are downwardly and forwardly extending frame members 14. The members 14 are parallel with each other and are arranged above the respective frame members 12.

The frame members 14 extend forwardly a substantial distance beyond the forward ends of the frame members 12. At their forward ends the frame members 12 are connected to the respective frame members 14 by upright frame members 15.

Secured to the forward ends of the frame members 14 are forwardly extending frame members 16 supported at their forward ends by caster wheels 17.

Rotatably supported on the member 13 are parallel sprocket wheels 18 arranged in an inclined position. Pivoted to the respective frame members 13 forwardly from the sprocket wheels 18 are opposite frame members 19, extending downwardly and forwardly in the machine. The rear ends of the frame members 19 are preferably somewhat higher than the rear ends of the frame members 14, and their forward ends are preferably somewhat lower than the forward ends of the frame members 14.

Rotatably supported on the forward ends of the frame members 19 are sprocket wheels 20, arranged in alinement with the respective sprocket wheels 18. Mounted on one sprocket wheel 18 and one sprocket wheel 20 is a chain 21. Mounted on the other sprocket wheels 18 and 20 is another chain 21ᵃ. The sprocket wheels are of such size and are so located that the inner adjacent stretches of the chains 21 and 21ᵃ normally travel quite close to each other.

On each frame member 19 is a plurality of downwardly extending spindles or shafts 22. On the spindles or shafts 22 are sleeves 23. The sleeves 23 have at their upper ends laterally extending arms 24, and at their lower ends laterally extending arms 25. Rotatably supported on the arms 25 are idler sprocket wheels 26. The sprocket wheels 26 supported by one frame member 19 travel adjacent to the inner stretch of one of the chains, and the sprocket wheels 26 supported on the other frame member 19 travel adjacent to the inner stretch of the other chain 21ᵃ. The sprocket wheels 26 are held in engagement with the chains 21 and 21ᵃ and tend to yieldingly press the inner stretches of said chains together on account of the springs 27 secured to the respective arms 24 and to the frame members 19.

Pivotally supported on the frame of the machine between the inner and outer stretches of the chains 21 and 21ᵃ are bell crank levers 28, having on one end idler sprockets 29 near the outer stretch of the adjacent chains and having secured to their other ends, springs 30. The springs 30 are also connected to the frame of the machine in such a way that they suitably hold the sprockets 29 adjacent to the outer stretches of the chains 21 and 21ᵃ so as to hold the chains reasonably tight.

The forward ends of the frame members 19 are supported in the following manner.

Secured to the forward ends of the frame members 14 are upwardly and inwardly curved bracket members 31. Pivoted to the upper inner end of each bracket member 31 is a downwardly extending supporting rod 32. Secured to the lower end of each rod 32 is a forward end of one of the frame members 19.

Secured to the forward ends of the frame members 19 are brackets 33 having alined bearing members or journals 34. A shaft 35 is extended through the openings in the bearing members 34, as shown in Fig. 4, and is adjustably held in position therein by means of the set screw 36.

Slidably received on the shaft 35 is a sleeve 37 one end of which may abut against the bearing 34 in which the shaft 35 is mounted. The opposite end of the sleeve 37 is slidably received in the other bearing 34 and is adjustably secured therein by means of the set screw 36ᵃ.

The bearings 34 are connected by a contractible coil spring 38ᵃ tending to yieldably draw the bearings 34 together, and hold the sleeve 37 against the bearing 34 in which one end of the shaft 35 is mounted.

It is noted however, that if the operation of the machine should require such movement, the sleeve 37 may slide on the shaft 35 for increasing the distance between the bearings 34. The sleeves 37, however, limit nearness to which the bearings 34 may approach together.

By adjusting the one bearing 34 in which the sleeve 37 is received, on said sleeve, the minimum distance between said bearings 34 may be regulated as desired.

Secured to the forward ends of the auxiliary frame members 19 are gathering arms 38 extending downwardly and forwardly and having their lower ends inclined away from each other as illustrated in Fig. 3. Suitably mounted on the frame of the machine are beet plows 100 for loosening the beets in the ground.

It will be seen that the gathering arms will travel along the rows of beets and that the foliage at the tops of the beets will be gathered between the arms 38. It is practically impossible in drawing a big machine along the ground to keep the center of the machine along the row of the center of the vegetables. It is therefore, desirable that some construction be adopted whereby the tops of the beets may be gripped between the endless carriers regardless of the position of the beets with relation to the longitudinal central axis of the machine, when the beet is dug from the ground.

With my improved device, the gathering arms 38 reach outwardly at their forward ends to embrace the beets in the rows. Ordinarily the rows of beets are very straight and the gathering arms 38 will remain at the sides of the row, and they will swing the auxiliary frame members on the pivot points on the upper ends of the rods 32, so that the lower forward ends of the auxiliary frame members are always in position for permitting the beets to be engaged between the lower ends of the inner stretches of the chains.

The lower ends of the auxiliary frame members may move laterally with relation to each other for varying the distance between the lower ends of said inner chain stretches. This is desirable on account of the fact that the thickness of the foliage and the tops of the beets may vary considerably.

Where the beets are uniformly small the bearing shown at the left-hand side of Fig. 4, may be adjusted toward the other bearing 34 so as to decrease the minimum distance between the auxiliary frame members 19.

If on the other hand the beets run generally large, the bearing 34 which is slidable on the sleeve 37 may be moved for increasing the minimum distance between the auxiliary frame members.

Many modifications of structure may be made in my improved device, and I desire to cover by this application any changes in the form or structure of my device which may be included within the reasonable scope of my claims.

I claim as my invention:

1. In a device of the class described, a frame mounted on wheels, auxiliary frame members pivoted at one end on said first frame, means for supporting the other end of said auxiliary frame members for permitting them to swing laterally in the machine, and flexible carrying devices mounted on the respective auxiliary frame members and adapted to coact with each other for carrying vegetables substantially longitudinally in the machine.

2. In a device of the class described, a frame mounted on wheels, auxiliary frame members pivoted at one end on said first frame, means for supporting the other end of said auxiliary frame members for permitting them to swing laterally in the machine, flexible carrying devices mounted on the respective auxiliary frame members and adapted to coact with each other for carrying vegetables substantially longitudinally in the machine, downwardly and forwardly projecting gathering arms on the respective auxiliary frame members having their lower ends inclined away from each other.

3. In a device of the class described, a frame mounted on wheels, auxiliary frame members pivoted at one end on said first frame, means for supporting the other end of said auxiliary frame members for permitting them to swing laterally in the machine, and flexible carrying devices mounted on the respective auxiliary frame members and adapted to coact with each other for carrying vegetables substantially longitudinally in the machine, means for limiting the movement of the movable ends of said auxiliary frame members toward each other.

4. In a device of the class described, a frame mounted on wheels, auxiliary frame members pivoted at one end on said first frame, means for supporting the other end of said auxiliary frame members for permitting them to swing laterally in the machine, flexible carrying devices mounted on the respective auxiliary frame members and adapted to coact with each other for carrying vegetables substantially longitudinally in the machine, means for limiting the movement of the movable ends of said auxiliary frame members toward each other, and yielding means for limiting the movement of the movable ends of said auxiliary frame members away from each other.

5. In a vegetable harvesting machine, a frame mounted on wheels, auxiliary frame members each having one end pivotally mounted on said first frame, means for supporting the other end of said auxiliary frame members for permitting them to move laterally in the machine, endless chains mounted on the respective auxiliary frame members having their inner stretches adjacent to each other, and engaging devices on the respective auxiliary frame members adapted to yieldingly move the inner stretches of said chains toward each other.

6. In a device of the class described, a frame mounted on wheels, auxiliary frame members pivoted at one end on said first frame, means for supporting the other ends of said auxiliary frame members for permitting them to swing laterally in the machine, flexible endless carrying devices mounted on the respective auxiliary frame members and adapted to coact with each other for carrying vegetables rearwardly and upwardly in the machine, means for limiting the movement of the movable ends of said auxiliary frame members toward each other, said means being adjustable, yielding means for limiting the movement of the movable ends of said auxiliary frame members away from each other, and gathering arms secured to the forward ends of said auxiliary frame members, and adapted to swing laterally therewith.

Des Moines, Iowa, Oct. 27, 1916.

FRED PRIOR.

Copies of this patent may be obtained for five cents each, by addressing the "Commissioner of Patents, Washington, D. C."